Figure 1:
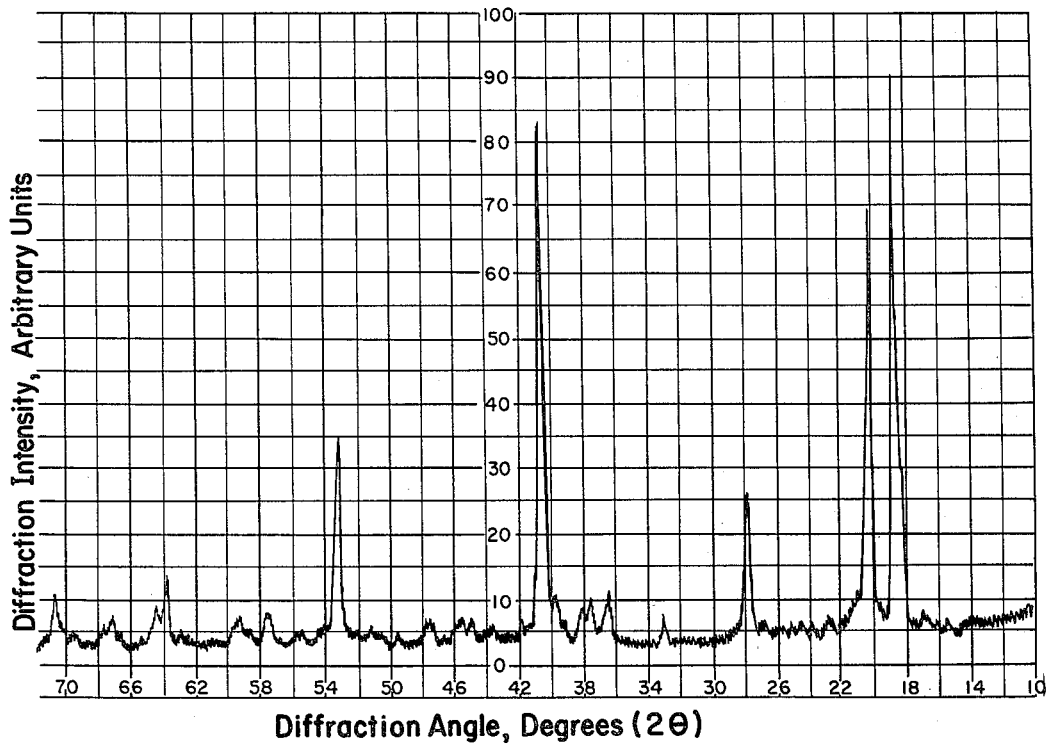

July 2, 1963       M. M. STEWART       3,096,154
METHOD FOR PREPARING BETA-ALUMINA TRIHYDRATE
Filed Dec. 23, 1959                    2 Sheets-Sheet 1

INVENTOR.
Meredith M. Stewart
BY
his ATTORNEY 3,096,154
METHOD FOR PREPARING BETA-ALUMINA TRIHYDRATE
Meredith M. Stewart, Penn Hills, Pa., assignor to Gulf Research & Development Company, Pittsburgh, Pa., a corporation of Delaware
Filed Dec. 23, 1959, Ser. No. 861,525
7 Claims. (Cl. 23—143)

This invention relates to the preparation of certain forms of alumina and alumina hydrate. More particularly it pertains to a novel method of preparing the precursor hydrate for eta-alumina, namely, beta-alumina hydrate, and to the novel preparation of eta-alumina via the new method of preparing its hydrate precursor.

Among its many uses alumina is widely used as a catalyst or as a component of catalysts. It is especially valuable as a catalyst support or carrier for metals such as platinum, palladium, nickel, cobalt, molybdenum, tungsten, etc., and for the oxides or sulfides of certain of these metals. Catalysts in which alumina is the support or carrier are used for a number of different catalytic conversions of hydrocarbons. For example, platinum on alumina and molybdenum oxide on alumina are used for catalytic reforming of naphtha in the presence of hydrogen. Platinum on alumina is used for hydroisomerization of paraffins. Chromium oxide on alumina is used for dehydrocyclization of paraffins. Cobalt molybdate on alumina is used for hydrogen treating various hydrocarbon fractions.

The alumina used for catalytic purposes is crystalline aluminum oxide, $Al_2O_3$, that has been substantially dehydrated but contains a small amount of water that is essential for its catalytic function. A number of distinct crystalline modifications or forms of alumina have been identified. Catalytic alumina usually is composed of a mixture of different forms. Catalytic alumina is commonly prepared by forming an alumina hydrate (sometimes also designated as aluminum hydroxide) and then thermally decomposing the hydrate to produce one or more of the forms of catalytically active crystalline alumina. The form of alumina obtained depends upon the particular hydrate and upon the temperature employed for dehydration.

The physical characteristics of the different forms of alumina and their precursor hydrates and the conditions under which particular hydrates are converted to particular forms of alumina have been investigated extensively and have been reported in the literature. See, for example, the publication of Alcoa Research Laboratories, "Technical Paper No. 10 (Revised), Alumina Properties" (1956) by A. S. Russell et al., and the paper by H. C. Stumpf et al. "Thermal Transformations of Aluminas and Alumina Hydrates," Industrial and Engineering Chemistry, volume 42, No. 7, pages 1398–1403 (July 1950). In discussing the different forms of alumina and alumina hydrates I will use the nomenclature commonly accepted in the United States, such as used in these publications.

It has recently been disclosed that a form of alumina known as eta-alumina is superior to other forms for certain catalytic purposes. For instance, U.S. 2,796,326 discloses that a catalyst comprising platinum on eta-alumina has superior activity and retention of activity in catalytic reforming of naphtha.

Eta-alumina can be made by thermally decomposing the hydrate, beta-alumina trihydrate or, bayerite, as it is also called, but the known methods for making beta-alumina trihydrate have so many drawbacks that the production of eta-alumina has been expensive. Eta-alumina has been found to be superior for certain purposes but has not been as low in price as other forms of alumina or mixtures of different forms of alumina for which more satisfactory methods of preparation are known. Thus, the known methods for making beta-alumina trihydrate have required the use of expensive reagents or separation procedures, or have required long aging periods for intermediate products, or have produced beta-alumina trihydrate merely as a minor component of a mixture of hydrates, or have produced beta-alumina trihydrate that contains metallic impurities such as sodium or that has large crystals.

Procedures that yield a mixture of hydrates instead of pure beta-trihydrate cannot be used for preparing high purity eta-alumina because dehydration of the mixture of hydrates results in a mixture of different forms of alumina. Procedures that form beta-alumina trihydrate that contains certain metallic impurities such as sodium or that has large crystals have the same disadvantage. It appears that metallic impurities such as sodium catalyze the dehydration of beta-alumina trihydrate to alpha-alumina monohydrate, also known as "boehmite," which in turn is dehydrated to gamma alumina so that, at best, the dehydration product is a mixture of eta-alumina with other forms of alumina rather than high purity eta-alumina. Large crystals of beta-alumina trihydrate cannot by thermal decomposition be satisfactorily converted to high purity eta-alumina. I do not wish to be bound by any theoretical explanation, but it has been postulated that a high partial pressure of steam is developed within the large crystals when they are heated and that this high pressure steam promotes the formation of products other than eta-alumina.

The present invention is based on my discovery that small crystal beta-alumina trihydrate, substantially free of sodium or other substances that promote the conversion of the trihydrate to forms of alumina other than eta-alumina, can be prepared by precipitating beta-alumina trihydrate from an aqueous solution of aluminum and hydroxyl ions under carefully controlled conditions of pH and temperature. Briefly, my new method comprises mixing an aqueous solution of aluminum ion, preferably an aqueous solution of aluminum chloride, with an aqueous solution of hydroxyl ion, e.g., an aqueous solution of ammonium hydroxide, both solutions being essentially free of metals other than aluminum, in proportions such as to maintain a pH of at least 9 in the mixed solution, while maintaining the temperature below about 120° F. This produces a crystalline alumina hydrate precipitate that is almost entirely beta-alumina trihydrate of small crystal form and essentially free of metallic impurities. After separation from the liquid the hydrate is dried to remove mechanically-held water. The hydrate is then dehydrated by higher temperature heating or calcining to obtain a product composed almost entirely of eta-alumina. In the preferred embodiment of my method, which produces the highest purity eta-alumina, the hydrate is washed with ammonium hydroxide solution before being dehydrated.

Essential elements of my method of preparation are that the solutions of aluminum ion and hydroxyl ion are mixed under carefully controlled conditions of temperature and pH and in the absence of metallic contaminants. The beta-alumina trihydrate, or bayerite, must be free of metallic impurities that catalyze the dehydration of bayerite to gamma alumina and other forms other than eta-alumina. Therefore, for precipitating high purity bayerite I employ solutions of aluminum and hydroxyl ions that are free of such impurities. The aqueous solution of aluminum ion is formed by dissolving aluminum chloride or aluminum nitrate in water. Solutions of other aluminum salts will form bayerite but not the high purity bayerite that is obtained by my method. For example, if aluminum sulfate is reacted with ammonium hydroxide, while maintaining the pH above 9.0, a crystalline precipitate is obtained that contains a major amount of bayerite. However, I have found that this bayerite is mixed with large amounts of other forms of crystalline alumina hydrates and possibly with amorphous alumina. Consequently, when this material is dehydrated the product is a mixture of substantial amounts of different forms of alumina rather than the high purity eta-alumina that is obtainable by my method.

The hydroxyl ion solution is most favorably employed in the form of a solution of ammonium hydroxide. Under certain conditions beta-alumina trihydrate can be obtained by adding aluminum chloride to a metallic hydroxide solution but it is almost impossible to remove completely the metallic cations such as sodium or potassium from the hydrate. As I have mentioned these metallic impurities will catalyze the dehydration of bayerite to forms of alumina other than eta-alumina. Therefore, it is important to use a non-metallic compound, such as ammonium hydroxide, which in aqueous solution will yield hydroxyl ion and a volatile cation. The alternative, if a metallic hydroxide is used, is to wash the hydrate extremely thoroughly to remove all metallic impurities. As a practical matter, it is generally not economically feasible to wash such a product sufficiently to reduce the metallic impurities to a low enough concentration. Although ammonium hydroxide is the most suitable source of hydroxyl ion, other non-metallic compounds that will yield the hydroxyl ion and maintain the proper pH during reaction with the aluminum ion can be used. For example, an aqueous solution of ammonium carbonate is essentially equivalent to ammonium hydroxide for my purposes. Other suitable compounds include water soluble substituted ammonium hydroxides in which one or more of the hydrogen atoms attached to the nitrogen atom are replaced by a hydrocarbon radical such as a methyl or ethyl radical.

The control of pH during precipitation of the beta-alumina trihydrate is of the utmost importance in my method. In prior art preparations of alumina, the common practice has been to add ammonium hydroxide to a solution of aluminum chloride. When following this procedure the pH of the mixed solution initially will be about 2 to 3, because of the acidity of the aluminum salt solution. The initial product of this prior art procedure is a colloidal solution of aluminum hydroxide which sets to form a gel when the pH rises to about 5 with continued addition of hydroxide. I have now discovered that by maintaining the solution decidedly basic, i.e., between about 12 to 9.0, I obtain a product entirely different from that obtained by the described prior art method.

In the simplest form of my method the aluminum chloride or nitrate solution is added in small increments to the ammonium hydroxide solution while stirring and thoroughly mixing the solutions. The concentrations of the two solutions, the proportions thereof, the rate of addition of the acidic salt solution to the hydroxide solution and the thorough mixing thereof, are adapted to maintain the pH of the mixed solution decidedly basic, specifically, no lower than 9, throughout the solution and during the entire operation. Instead of the hydrate gel or sol that is obtained under acidic conditions, I obtain by my procedure of adding the aluminum salt solution to the hydroxide under basic conditions and at a temperature below about 120° F., and preferably in the range of 50° to 90° F. an immediate crystalline precipitate. The precipitate is high purity bayerite containing at least about 95 weight percent bayerite. Precipitates containing 99 percent or more bayerite can be formed by my method. The bayerite, in contrast to bayerite prepared by some methods, is of small crystal form and is essentially free of sodium and other metallic impurities.

Control in maintaining a decidedly basic pH, i.e., at least 9, in the solution from which the bayerite is precipitated can be achieved most simply in accordance with the invention by adding the aluminum chloride or nitrate solution in small increments to a vessel containing the hydroxide solution, while stirring the mixture. Ammonium hydroxide solution will have a maximum pH of about 12. As the aluminum chloride solution is added the pH will decrease. However, by slowly adding a sufficiently dilute solution of aluminum chloride or nitrate to the ammonium hydroxide solution while constantly stirring the mixture the pH is kept above 9, e.g., in the range of about 12 to 9. The hydroxide solution must not be too dilute or the required basicity may not be achieved. However, I have found that a highly concentrated hydroxide solution can yield bayerite that contains boehmite. For the method of the present invention a suitable concentration range for ammonium hydroxide solution is about 0.1 to 4 molar. A similar concentration range for aluminum chloride or nitrate solution is suitable.

It is also possible to mingle flowing streams of aluminum chloride or nitrate solution and ammonium hydroxide solution if the solutions are thoroughly mixed upon contact and their concentrations and relative proportions are such that the pH of the mixture is at all times at least 9.0.

The preferred temperature for precipitation of bayerite by my method is room temperature, i.e., about 50° to 90° F. The lower temperature is not critical. It must simply be above the freezing point of the solutions. However, the temperature should be below about 120° F. I have found that at temperatures above about 120° F. the precipitate has a substantial content of a hydrate form of alumina known as "pseudo-boehmite." The latter material is not well characterized but is believed to result from the incomplete conversion of aluminum hydroxide to alpha-aluminum monohydrate or "boehmite," as it is also called. The water of hydration in pseudo-boehmite has been reported as between 1.4 and 2.0 water molecules, as compared with 1.0 for boehmite and 3.0 for bayerite. Dehydration of bayerite having a substantial content of pseudo-boehmite, as is obtained by precipitation at a temperature above about 120° F., yields a product containing eta-alumina and a substantial content of gamma-alumina. Thus, the product is not the high purity eta-alumina that is obtained by the method of the present invention.

In contrast to other alumina preparation methods which produce a gelatinous precipitate that must be aged for a long period to obtain the desired hydrate, my method yields an immediate crystalline precipitate. This precipitate can be separated immediately from the supernatant liquid by filtration, decanting, centrifuging or the like, and then washed, dried and calcined to form eta-alumina. When the preferred conditions of my method are used the precipitate is high purity bayerite which dehydrates to high purity eta-alumina. As I will explain more fully hereinafter, in a preferred modification of my method the bayerite precipitate contains a small amount of alpha-aluminum trihydrate, or "gibbsite," as it is also called, and this precipitate upon dehydration yields the highest purity eta-alumina that I have obtained.

After separation from the supernatant liquid the precipitate is washed until it is free of chlorine ion. The precipitate can be washed with ammonium hydroxide solution or with water. Advantages of the invention can be obtained with either washing liquid. However, I have found that a superior ultimate product is obtained when the precipitate is washed with ammonium hydroxide solution. As I will demonstrate subsequently with reference to actual preparations, the product obtained by washing the precipitate with distilled water followed by drying and partial dehydration has a substantial content of boehmite. The product of further dehydration of boehmite is gamma-alumina. Accordingly, when the precipitate is washed only with water the ultimate alumina product will have a substantial content of gamma-alumina and will not be the highest purity eta-alumina that can be obtained by my method. On the other hand, I have found that when the precipitate is washed with a dilute solution of ammonium hydroxide, e.g., 5 percent or less NH₃, the product obtained thereafter by drying and partial dehydration is almost entirely bayerite, but contains a small amount of gibbsite. Gibbsite dehydrates to chi-alumina rather than to the desired eta-alumina, but it appears to be present in a lower concentration in the intermediate product of this preferred method of preparation than the boehmite that occurs in the intermediate product obtained when the precipitate is washed only with water. Accordingly, although the ultimate eta-alumina product obtained when the precipitate is washed with dilute ammonium hydroxide will contain a small amount of the dehydration product of gibbsite, it will be of higher purity, e.g., 95 to 99 percent, than eta-alumina obtained by other methods.

The bayerite is converted to eta-alumina by calcination under the known conditions for dehydrating bayerite to eta-alumina. This can be accomplished by heating the bayerite at a temperature of about 500° to 1200° F. for sufficient time to accomplish dehydration. The time required is about 1 to 24 hours, more time being required for the lower temperature of the range and less for the higher temperatures. The calcination must be carried out in the absence of steam because as I have indicated, steam causes conversion of bayerite to boehmite. Consequently, the bayerite precipitate is dried, normally at about 250° F. for several hours, to remove mechanically bound water associated with the precipitate before subjecting the hydrate to calcination. Also to avoid steam effects during dehydration, the bayerite should be heated rapidly to calcination temperature. This will aid in dispersing evolved steam. In large scale preparations, to insure a sufficiently dry atmosphere during calcination it is desirable to pass a current of air through the heating zone to sweep away evolved steam. However, in calcining small batches of bayerite in an average size laboratory furnace the volume of the furnace is large enough that no special precautions are needed to avoid excessive steam contact with the bayerite.

Further understanding of the invention can be obtained from examples of preparations hereinafter and from the drawings, of which:

FIGURES 1–4 are X-ray diffractometer tracings obtained in analysis of products of certain of the examples.

EXAMPLE 1

(RN—81–110)

A solution formed by dissolving 2,000 grams of aluminum chloride hexahydrate (AlCl₃.6H₂O) in 10 liters of water was added drop-wise with rapid stirring to a solution formed by mixing 4 liters of ammonium hydroxide solution (28 percent NH₃) with 10 liters of water at room temperature, i.e., about 80° F. During the entire period of mixing the two solutions the pH of the mixed solution was maintained in the range of 9.5 to 12. A white crystalline precipitate formed immediately upon the addition of the aluminum chloride solution. After completing the addition of the aluminum chloride solution the slurry was filtered to recover the precipitate. The precipitate was washed with 10 liters of dilute ammonium hydroxide (5 percent NH₃). The washing was continued until the wash water showed no test for chloride ion with silver nitrate solution. The wet precipitate was dried at 250° F. for 28 hours. The dried product was a soft, white, opaque powder. FIGURE 1 and the other figures of the drawing are reproductions of tracings obtained by X-ray analysis of products of the examples, using Copper Kα radiation and a recording diffractometer. FIGURE 1, which pertains to the product of Example 1, plots the diffraction intensity, in arbitrary units, against the diffraction angle (2θ) in degrees. Interpretation of the pattern of FIGURE 1 by reference to the X-Ray Powder Data File of the American Society of Testing Materials, and specifically to cards No. 8–96 (bayerite) and No. 7–324 (gibbsite) thereof, shows that the product is essentially bayerite, although there is a slight indication of gibbsite.

The bayerite product of Example 1 was subsequently converted to a high purity eta-alumina by heating in air at 900° F. for about 16 hours and the calcined material was subjected to various measurements. The surface acidity was measured by titration with n-butylamine. In this procedure the alumina was equilibrated as a slurry with n-butylamine in benzene. Portions thereof were then dried on spot plates and tested with indicators. The results of the surface acidity measurements are reported in the table below in terms of milliequivalents of acid per gram of alumina. The table also lists the data from measurements of pore volume, surface area and pore size distribution of the alumina.

TABLE I

| | |
|---|---|
| Pore volume, cc./gm. | 0.307 |
| Average pore radius, angstroms | 13.4 |
| Surface area, sq. m./gm. | 457 |
| Pore size distribution: | |
| Vol. percent in pore radius range— | |
| 300–200 Angstroms | 6.9 |
| 200–100 | 11.2 |
| 100–50 | 4.7 |
| 50–40 | 1.1 |
| 40–30 | 1.5 |
| 30–20 | 3.2 |
| 20–15 | 6.7 |
| 15–10 | 27.3 |
| 10–7 | 37.6 |

| Surface acidity: pKa— | Milliequivalents of acid/gm. of alumina |
|---|---|
| +6.8 (Weak) | 0 |
| +3.3 (Weak) | 0 |
| +1.5 (Weak) | 0 |
| −3.0 (Weak) | 0 |
| −5.6 (Strong) | 0 |

The above data show that the eta-alumina product of Example 1 had a high surface area, small average pore radius and a large number of small pores of radius less than 20 Angstroms. However, unlike some aluminas, a number of pores were of radius greater than 100 Angstroms. The alumina was found to have no measurable acid sites by the method employed.

The product of Example 1 is convertible to high purity eta-alumina by calcining or heating at a temperature in the range of about 500° to 1200° F. for sufficient time to dehydrate the trihydrate to alumina, e.g., for about 1 to 24 hours, depending on the temperature. To identify the dehydrated product by X-ray diffraction as being high purity eta-alumina that contains little or no gamma-alumina is difficult because the X-ray diffraction patterns of eta- and gamma-alumina are confusingly similar. However the product is identified as high purity eta-alumina by other facts. Thus, the identity of the precursor for eta-alumina, namely, bayerite, is established by X-ray diffraction analysis of the product of Example 1, the bayerite diffraction pattern being clearly distinguishable from patterns of other hydrates. FIGURE 1 of the drawing, which is the X-ray diffraction pattern for the product of Example 1, shows little or no indication of substances other than bayerite in the product, except for a slight indication of gibbsite which normally dehydrates to chi-alumina.

According to the known principles of thermal decomposition of alumina hydrates, bayerite, except under certain exceptional circumstances, dehydrates to eta-alumina when heated in a dry atmosphere at certain temperatures as employed in my process. Exceptional circumstances which can cause conversion of bayerite at least in part to boehmite, the precursor for gamma-alumina, include the presence of substances such as sodium in the bayerite, the contacting of steam with the decomposing bayerite and the existence of bayerite crystals that are large enough to create high steam pressure within the crystals when heated. My method of preparation employs reagents that are free of substances such as sodium that promote the conversion of bayerite to boehmite. Therefore, the bayerite product of my method is free of such substances. Furthermore, in my method the dehydration of the bayerite is carried out in a dry atmosphere. Still further, my method forms a bayerite product that is a fine powder of such small crystal size that excessive steam pressure does not develop within the crystals when heated.

In summary, my method forms high purity bayerite free of substances that would cause substantial conversion of the bayerite to boehmite and the dehydration is carried out under conditions that are known to convert bayerite to eta-alumina.

As further proof that calcination converts the bayerite product of my method to high purity eta-alumina and not merely to a mixture of eta-alumina with a large amount of gamma-alumina, the bayerite product of Example 1 has been subjected to mild heating or partial dehydration under conditions that would convert to boehmite any material susceptible to such conversion. The product of mild heating or partial dehydration of the bayerite of Example 1 shows no evidence of boehmite when examined by X-ray analysis. Therefore, since the bayerite is not converted to the precursor for gamma-alumina under conditions at which such precursor would be formed, the ultimate dehydration product will be the only other product obtained by dehydration of bayerite under these conditions, i.e., eta-alumina, except possibly for a small amount of chi-alumina which is formed from the small amount of gibbsite in admixture with the bayerite. These facts are more fully illustrated by the following example.

EXAMPLE 2

Figure 2:
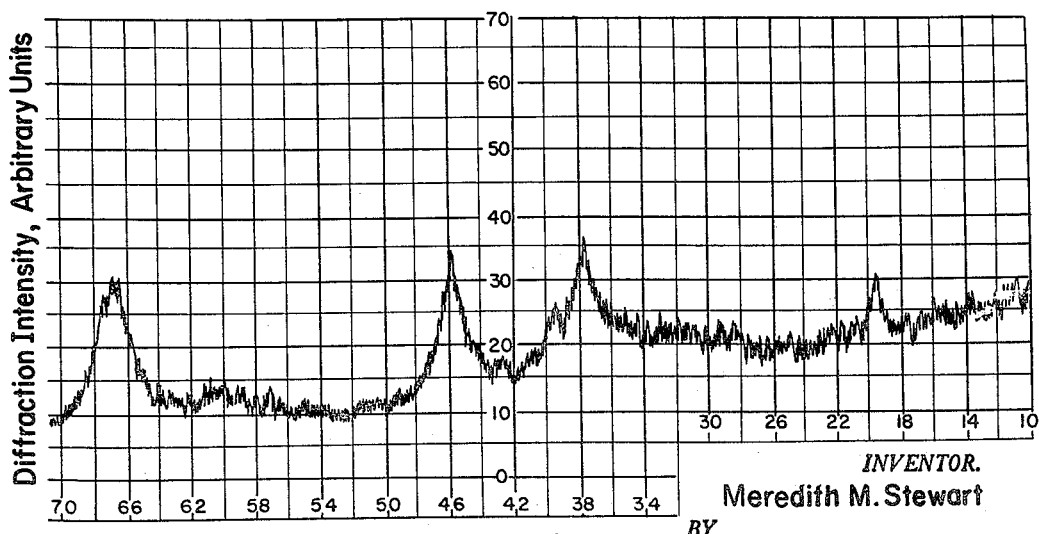

The dried bayerite product of Example 1 was heated at 250° C. for 13 hours. This treatment was insufficient to dehydrate the product to the ultimate desired product, eta-alumina, but was sufficient to convert any portion of the initial product that was susceptible to such conversion to boehmite, the precursor for gamma-alumina. After the indicated heating period the product was examined by X-ray diffraction. FIGURE 2 shows the result.

The X-ray pattern of FIGURE 2 gives no indication that boehmite was formed by heating the Example 1 product at 250° C. This establishes that the bayerite product of Example 1 can be converted to high purity eta-alumina without the production of substantial amounts of gamma-alumina inasmuch as the precursor for gamma-alumina, namely, boehmite, was not produced in detectable amount by the partial dehydration of Example 2.

The following example describes an alumina hydrate preparation carried out by a conventional method of preparation in which ammonium hydroxide is added to an aluminum chloride solution. The reagents and re-action conditions were essentially the same as in Example 1, but the procedure differs in essential respects from my novel method of preparation.

EXAMPLE 3

(RN 102–118)

Figure 3:
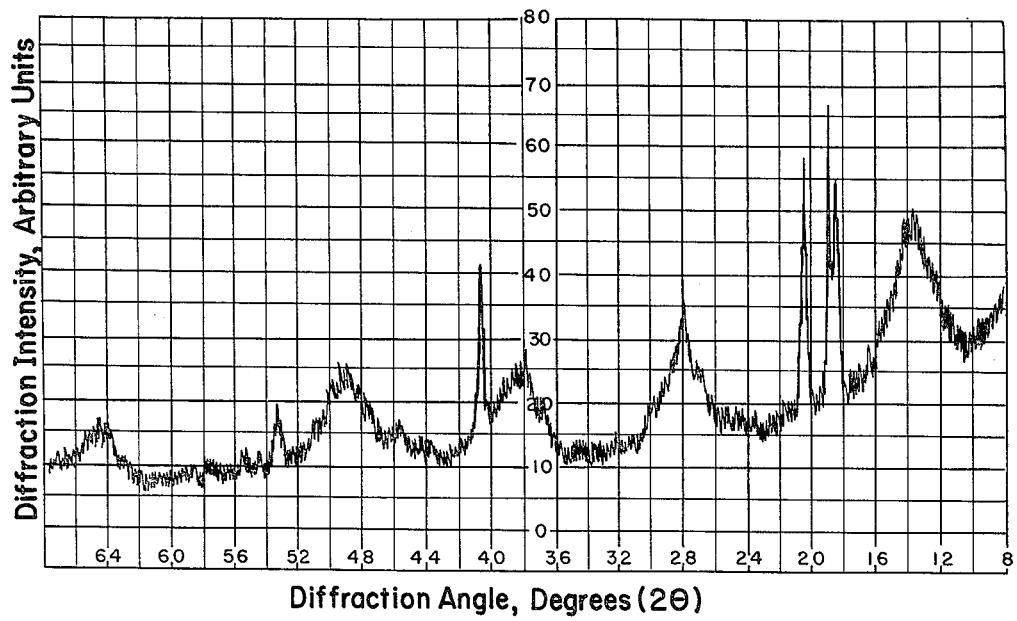

A solution formed by mixing 4 liters of ammonium hydroxide solution (28 percent $NH_3$) with 10 liters of water was added drop-wise with rapid stirring to a solution of 2,000 grams of aluminum chloride hexahydrate in 10 liters of water at room temperature. The initial pH was 2.3 and the final pH was 9.2. During the addition of ammonium hydroxide a thick gel was formed at a pH of 4.1. This gel was broken up and stirred into a smooth slurry and the addition of ammonium hydroxide was continued until the full amount was added. The final product was a thick translucent gel which was completely different in appearance from the soft powder product of Example 1. The product was filtered, the filtering operation being very slow in contrast to the rapid filtration that was possible with the product of Example 1. The product was then washed with 160 liters of dilute ammonium hydroxide (5 percent $NH_3$) until the wash water was free of chloride ion. The wet gel was dried at 250° F. for 72 hours and was subsequently examined by X-ray diffraction. The results are shown in FIGURE 3. By reference to the ASTM X-Ray Powder Data File it can be seen that the tracing of FIGURE 3 gives evidence that the product contained large amounts of gibbsite (Card No. 7–324) and boehmite (Card No. 5–0190), in addition to bayerite. The entirely different X-ray diffraction pattern of FIGURE 2, which indicates a large content of boehmite, provides evidence, in addition to the obvious visual dissimilarities, of the difference between this product and the high purity bayerite product of Example 1. Dehydration of this product yields a mixture of aluminas comprising a large amount of gamma-alumina.

The following example describes the preparation of bayerite in accordance with the invention substantially as in Example 1 except that the precipitate was washed only with water.

EXAMPLE 4

(RN 102–31)

Figure 4:
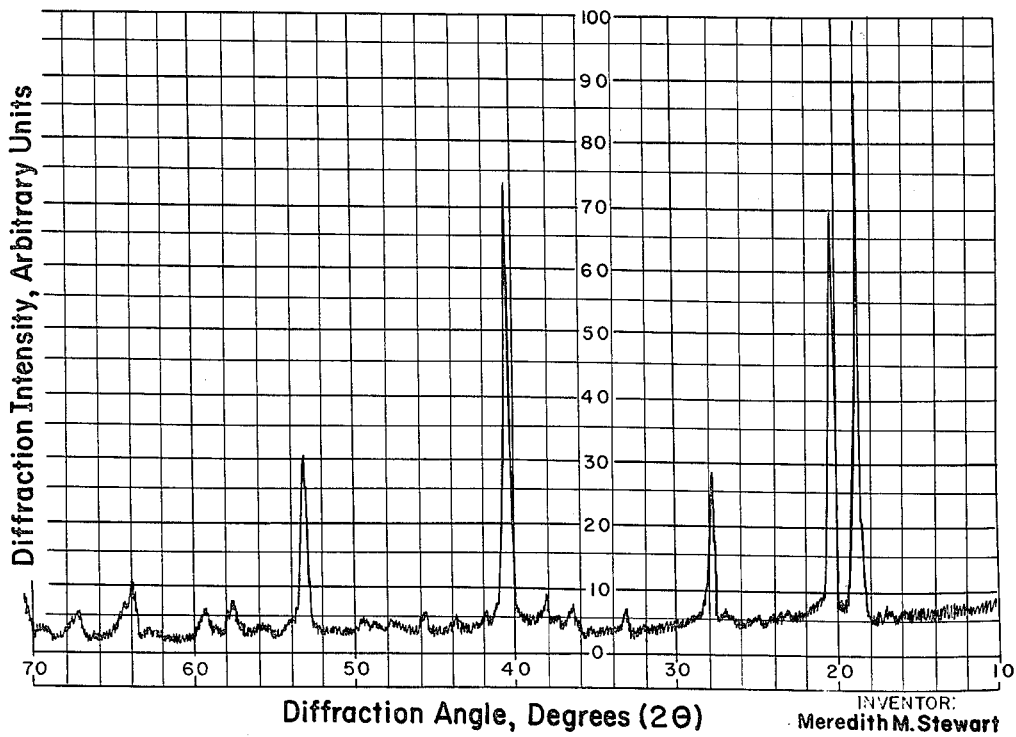

A solution formed by dissolving 2,000 grams of aluminum chloride hexahydrate in 10 liters of water was added drop-wise with constant stirring and at room temperature to a solution formed by mixing 4 liters of ammonium hydroxide (28 percent $NH_3$) with 10 liters of water. The initial pH of the ammonium hydroxide solution was about 10.7 and the final pH of the slurry was 9.8. The precipitate was recovered by filtration and washed with 46 liters of distilled water. Wash water was free of chloride at this point. The precipitate was dried at 250° F. for about 40 hours. The dried product was examined by X-ray diffraction and the tracing obtained is shown in FIGURE 4. The tracing shows an excellent pattern for high purity bayerite as specified by Card No. 8–96 of the ASTM X-Ray Powder Data File. In this pattern there is no indication of either gibbsite or boehmite and the pattern thus differs somewhat from the pattern for the Example 1 product (FIGURE 1) which indicates a slight amount of gibbsite.

EXAMPLE 5

The product of Example 4 was heated for 15 hours at 250° C. to determine whether precursors for forms of alumina other than eta-alumina would be formed. X-ray diffraction analysis revealed the presence of a small amount of boehmite in the product. However, the apparent content of boehmite was such as to indicate that further dehydration would yield a product containing no more than a small amount, i.e., less than 5 weight percent, of gamma-alumina, the rest of the product being eta-alumina. This is eta-alumina of considerably greater purity than obtainable by such prior art methods as Example 3.

Comparison of Examples 2 and 5 shows the advantage of my preferred procedure of Example 1 of washing the alumina hydrate precipitate with dilute ammonium hydroxide solution. As explained in Example 2, the product obtained when the precipitate was washed with dilute ammonium hydroxide solution gave an indication of a small content of gibbsite but no indication of boehmite. Complete dehydration of this material to alumina will yield a high purity eta-alumina that is substantially free of gamma-alumina and that contains only a small amount of chi-alumina which is the dehydration product of gibbsite. Although the washing procedure of Example 1 yields an ultimate product of somewhat lower gamma-alumina content than the procedure of Example 4, the ultimate product obtainable by either procedure in accordance with my invention is eta-alumina of much higher purity than the product obtainable by the conventional method of Example 3.

An important use for the eta-alumina prepared by the method of my invention is in the preparation of platinum-alumina catalysts which are used for such purposes as catalytic reforming of naphtha and hydroisomerization of paraffins. In these uses the eta-alumina prepared by my method has important advantages over alumina prepared by other methods. The following example describes the preparation of eta-alumina in accordance with the invention, the use of such alumina for preparing a halogen-promoted, platinum-alumina catalyst and the use of such catalyst for hydroisomerization of n-pentane.

EXAMPLE 6

A solution formed by mixing 5,000 grams of aluminum chloride hexahydrate with 25 liters of water was added drop-wise and with rapid stirring at room temperature to a solution formed by mixing 10 liters of ammonium hydroxide (28 percent $NH_3$) with 25 liters of water. The mixing was completed in 2 hours and 40 minutes. The final pH of the system, which was the lowest pH attained during the mixing operation, was 9.0. The mixture was filtered and the precipitate was washed with 100 liters of dilute ammonium hydroxide (5 percent $NH_3$) until the precipitate was free of chloride ion. The precipitate was then washed with 60 liters of water to remove ammonia. The precipitate was dried at 250° F. for about 24 hours and thereafter calcined at 900° F. for about 16 hours. The calcined material was mixed with about 3 weight percent of a standard catalyst binder and then pelleted. The pellets were crushed to 10 to 20 mesh size and the granules were impregnated with a dilute solution of chloroplatinic acid. The impregnated granules were dried at 250° F. and calcined at 900° F. The platinum content of the resulting platinum on eta-alumina catalyst was calculated as 0.6 weight percent. The calcined catalyst was treated with a dilute solution of hydrogen fluoride to provide a finished catalyst containing 3 weight percent fluorine. The catalyst was then employed for fixed-bed hydroisomerization of pure grade n-pentane. The reaction conditions were: liquid-hourly space velocity of 10.7 volumes of pentane per volume of catalyst per hour; temperature of 633° F.; pressure of 500 pounds per square inch gauge; and a hydrogen to hydrocarbon ratio corresponding to 0.70 hydrocarbon mol fraction. The isomerization product was composed of 0.8 weight percent $C_1$ to $C_4$ hydrocarbons, 49.0 weight percent isopentane and 50.2 weight percent n-pentane.

The following example describes the preparation of a platinum-alumina catalyst by a conventional method and the use of the catalyst for hydroisomerization of pentane under conditions similar to those of the foregoing example.

EXAMPLE 7

A solution formed by mixing 2 liters of ammonium hydroxide (28 percent $NH_3$) with 38 liters of water was added drop-wise and with constant stirring at room temperature to a solution formed by dissolving 2,000 grams of aluminum chloride hexahydrate in 20 liters of water. The pH of the system at the end of the operation was 6.5 and this was the highest pH attained. A gel was formed when the pH of the mixture was between 5 and 6.5. The alumina gel was recovered from the slurry by filtration and was washed with 20 liters of water. The filtration rate was slow. A gel with 4.7 percent solids was removed from the filter and stirred with a solution of 4.5 grams of aluminum chloride hexahydrate in 5 liters of water. This caused peptization of the alumina gel. A solution of 6 grams of chloroplatinic acid in 600 milliliters of water was saturated with hydrogen sulfide gas to form a platinum sulfide sol. This sol was added to the peptized alumina and stirred for 30 minutes. The mixture was evaporated to dryness at 250° F., pulverized and treated with a solution of 8.4 grams of hydrogen fluoride in 410 milliliters of water. The material dried to a hard cake which was crushed to 10 to 20 mesh and calcined for 16 hours at 550° F. and then for 2 hours at 900° F. The catalyst was found to contain 0.6 weight percent platinum and 1 weight percent fluorine. Subsequently, the catalyst was treated with a dilute solution of hydrogen fluoride to deposit an additional 2 percent fluoride on the catalyst. The HF-treated catalyst was dried at 250° F. and calcined at 900° F. to give a finished catalyst containing 0.6 percent platinum and 3 percent fluorine. The catalyst was used for fixed-bed hydroisomerization of pure grade n-pentane. The reaction conditions were: liquid-hourly space velocity of 8.3 volumes of pentane per volume of catalylst per hour; temperature of 631° F.; pressure of 500 pounds per square inch gauge; and hydrogen to hydrocarbon ratio corresponding to 0.70 hydrocarbon mol fraction. The hydroisomerization liquid product was 24.9 weight percent isopentane and 75.1 weight percent n-pentane. In another run the same n-pentane feed stock was hydroisomerized over the same catalyst at the same conditions, except that the temperature was 652° F. In this run the liquid product was 31.5 weight percent isopentane and 68.5 weight percent n-pentane.

Examples 6 and 7 provide a comparison of eta-alumina prepared by my method (Example 6) and alumina prepared by a conventional method (Example 7) as components of halogen-promoted, platinum-alumina catalysts for pentane hydroisomerization. The results show a marked superiority for Example 6 which employed the alumina prepared by my method. The product of Example 6 contained 49.0 percent isopentane in comparison to 24.9 percent isopentane in the product of the 631° F. run of Example 7. Thus, Example 6 which employed the alumina prepared by my method was operated at a higher space velocity and would be expected to give a lower conversion than the run at lower space velocity. However, the yield of isopentane was much higher in Example 6. Furthermore, even when the reaction temperature was raised to 652° F. in Example 7 the yield of isopentane was still much lower than obtained in Example 6 with the catalyst formed from alumina prepared by my method.

Although I have described using alumina made by my method as a component of a halogen-promoted, platinum-alumina catalyst, this alumina can be used with advantage for many other purposes. For example, it demonstrates the superiority that is characteristic of eta-alumina when used as a support in reforming catalysts, hydrocracking catalysts, etc. In fact, because of its high content of eta-alumina it will show significant advantages for catalytic purposes over so-called eta-alumina prepared by certain other methods, which in reality is low purity eta-alumina that contains large amounts of gamma-alumina and/or other forms of alumina. Thus, despite the simplicity of my method, the product is equal or superior in purity to eta-alumina prepared by more expensive and time-consuming prior art methods.

Obviously many modifications and variations of the invention as hereinbefore set forth may be made without departing from the spirit and scope thereof and therefore only such limitations should be imposed as are indicated in the appended claims.

We claim:

1. The method of preparing beta-alumina trihydrate without an aging step which comprises slowly adding in increments a dilute acidic aqueous solution of an aluminum salt selected from the group consisting of aluminum chloride and aluminum nitrate substantially free of metals other than aluminum with thorough mixing to a substantially sodium free 0.1 to 4 molar aqueous highly basic solution of an hydroxide compound having a non-metallic volatile cation, the slow rate of addition of increments of said acidic solution to said basic solution tending to only slowly decrease the pH of said basic solution from its highly basic value to a lower value, the lowest pH in the mixture of acidic solution and basic solution during the entire operation being no less than 9, maintaining the temperature of the mixed solution above freezing but below 120° F. during the entire operation, and recovering an immediate crystalline precipitate which comprises at least 95 percent bayerite.

2. Claim 1 wherein said acidic solution is about 0.1 to 4 molar.

3. The method of preparing beta-alumina trihydrate without an aging step which comprises slowly adding in increments a dilute acidic aqueous solution of an aluminum salt selected from the group consisting of aluminum chloride and aluminum nitrate substantially free of metals other than aluminum with thorough mixing to a substantially sodium free 0.1 to 4 molar aqueous highly basic solution of an hydroxide compound having a non-metallic volatile cation, the slow rate of addition of increments of said acidic solution to said basic solution tending to only slowly decrease the pH of said basic solution from its highly basic value to a lower value, the lowest pH in the mixture of acidic solution and basic solution during the entire operation being no less than 9, maintaining the temperature of the mixed solution above freezing but below 120° F. during the entire operation, and recovering an immediate crystalline precipitate which comprises at least 99 percent bayerite.

4. The method of preparing beta-alumina trihydrate without an aging step which comprises slowly adding in increments a dilute acidic aqueous solution of an aluminum salt selected from the group consisting of aluminum chloride and aluminum nitrate substantially free of metals other than aluminum with thorough mixing to a substantially sodium free 0.1 to 4 molar aqueous solution of ammonium hydroxide having a pH of about 12, the slow rate of addition of increments of said acidic solution tending to only slowly decrease the pH of said ammonium hydroxide solution from its initial pH of about 12 to a lower value, the lowest pH in the mixture of acidic solution and ammonium hydroxide solution during the entire operation being no less than 9, maintaining the temperature of the mixed solution below about 120° F. during the entire operation, and recovering an immediate crystalline precipitate which comprises at least 95 percent bayerite.

5. The method of preparing beta-alumina trihydrate without an aging step which comprises slowly adding in increments a dilute acidic aqueous solution of aluminum chloride substantially free of metals other than aluminum with thorough mixing to a substantially sodium free aqueous 0.1 to 4 molar aqueous solution of ammonium hydroxide, the slow rate of addition of increments of said aluminum chloride solution to said ammonium hydroxide solution tending to only slowly decrease the pH of said ammonium hydroxide solution from its initial value of about 12 to a lower value, the lowest pH in the mixture of aluminum chloride and ammonium hydroxide during the entire operation being no less than 9, maintaining the temperature of the mixed solution between about 50° F. and 90° F., separating the resulting immediate crystalline precipitate from supernatant liquid, washing said precipitate with aqueous ammonium hydroxide solution until the wash liquid is free of chloride ion, drying the precipitate at a temperature no higher than about 250° F. to remove mechanically-held water and recovering a product comprising at least 95 percent beta-alumina trihydrate.

6. The method of preparing eta-alumina which comprises slowly adding in increments a dilute acidic aqueous solution of an aluminum salt selected from the group consisting of aluminum chloride and aluminum nitrate substantially free of metals other than aluminum with thorough mixing to a substantially sodium free 0.1 to 4 molar aqueous solution of pH 12 of ammonium hydroxide, the slow rate of addition of increments of said acidic solution tending to only slowly decrease the pH of said ammonium hydroxide solution from its initial pH of 12 to a lower value, the lowest pH in the mixture of acidic solution and ammonium hydroxide solution during the entire operation being no less than 9, maintaining the temperature of the mixed solution between about 50° F. and 90° F., separating the resulting immediate crystalline precipitate comprising at least about 95 percent bayerite in the absence of aging from supernatant liquid, washing said precipitate with aqueous ammonium hydroxide solution until the wash liquid is free of ion selected from the group consisting of chloride and nitrate, drying the precipitate to remove mechanically-held water, dehydrating the precipitate by heating in a dry atmosphere at a temperature of about 500° F. to 1200° F. and recovering a product comprising at least about 95 percent eta-alumina.

7. The method of preparing eta-alumina which comprises slowly adding in increments a 0.1 to 4 molar acidic aqueous solution of aluminum chloride substantially free of metals other than aluminum with thorough mixing to a substantially sodium free aqueous 0.1 to 4 molar aqueous solution of ammonium hydroxide, the slow rate of addition of increments of said aluminum chloride solution to said ammonium hydroxide solution tending to only slowly decrease the pH of said ammonium hydroxide solution from its initial value of about 12 to a lower value, the lowest pH in the mixture of aluminum chloride and ammonium hydroxide during the entire operation being no less than 9, maintaining the temperature of the mixed solution between about 50° F. and 90° F., separating the resulting immediate crystalline precipitate comprising at least about 95 percent bayerite in the absence of aging from supernatant liquid, washing said precipitate with dilute ammonium hydroxide solution until the wash liquid is free of chloride ion, drying the washed precipitate at a temperature no higher than about 250° F. to remove mechanically-held water, dehydrating the precipitate by heating in a dry atmosphere at a temperature of about 500° F. to 1200° F. and recovering high purity eta-alumina essentially free of gamma-alumina and chi-alumina.

References Cited in the file of this patent

UNITED STATES PATENTS

| | | |
|---|---|---|
| 1,337,192 | Buchner | Apr. 20, 1920 |
| 2,737,444 | Fischer et al. | Mar. 6, 1956 |
| 2,796,326 | Kimberlin et al. | June 18, 1957 |
| 2,838,375 | Tester et al. | June 10, 1958 |
| 2,867,588 | Keith et al. | Jan. 6, 1959 |
| 2,898,307 | Keith | Aug. 4, 1959 |
| 2,914,488 | Gilbert | Nov. 24, 1959 |
| 2,917,365 | Gilbert | Dec. 15, 1959 |
| 2,932,620 | Von Fuener et al. | Apr. 12, 1960 |
| 2,980,632 | Malley et al. | Apr. 18, 1961 |